(12) United States Patent
Howard

(10) Patent No.: US 12,546,252 B2
(45) Date of Patent: Feb. 10, 2026

(54) INTEGRATED GAS TURBINE CYCLE AND LIQUID AIR ENERGY CONVERSION SYSTEM

(71) Applicant: Henry E. Howard, Grand Island, NY (US)

(72) Inventor: Henry E. Howard, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 19/092,045

(22) Filed: Mar. 27, 2025

(65) Prior Publication Data

US 2026/0036081 A1  Feb. 5, 2026

Related U.S. Application Data

(60) Provisional application No. 63/678,175, filed on Aug. 1, 2024.

(51) Int. Cl.
 *F02C 6/18* (2006.01)
 *F01K 23/10* (2006.01)
 (Continued)

(52) U.S. Cl.
 CPC ............. *F02C 6/18* (2013.01); *F01K 23/10* (2013.01); *F01K 25/10* (2013.01); *F02C 6/16* (2013.01);
 (Continued)

(58) Field of Classification Search
 CPC ...... F02C 6/18; F02C 6/16; F02C 7/08; F01K 23/10; F01K 25/10; F25J 2240/80; Y02P 80/10
 See application file for complete search history.

(56) References Cited

U.S. PATENT DOCUMENTS

9,217,423 B2  12/2015  Chen et al.
10,100,979 B2  10/2018  Ha et al.
(Continued)

FOREIGN PATENT DOCUMENTS

CA  2898845 A1  5/2014
JP  2002339760 A  11/2002
JP  6750120 B2  9/2020

*Primary Examiner* — Phutthiwat Wongwian
*Assistant Examiner* — Rene D Ford
(74) *Attorney, Agent, or Firm* — Robert J. Hampsch

(57) ABSTRACT

An integrated gas turbine cycle and liquid air energy conversion system is provided that utilizes very high pressure air stream(s) produced from vaporization of a supercritical liquid air against a low pressure cryogenic gas. The cooled, low pressure cryogenic gas is then cold compressed to yield a moderate pressure cryogenic gas stream(s). Both the very high pressure air stream(s) and the moderate pressure air stream(s) are warmed in the flue gas heat exchanger associated with the gas turbine cycle. A source of electrical power is produced from the expansion of combustion gas in a gas turbine while auxiliary sources of electrical power are produced from the turbine expansion of the warmed very high pressure air streams and moderate pressure cryogenic gas streams. The combustion gas includes a moderate pressure supplemental stream originating from the supercritical liquid air or from the cold compressed cryogenic gas.

19 Claims, 2 Drawing Sheets

(51) Int. Cl.
    *F01K 25/10*      (2006.01)
    *F02C 6/16*       (2006.01)
    *F02C 7/08*       (2006.01)

(52) U.S. Cl.
    CPC ............. *F02C 7/08* (2013.01); *F25J 2240/80* (2013.01); *Y02P 80/10* (2015.11)

(56) References Cited

U.S. PATENT DOCUMENTS

| | | |
|---|---|---|
| 2008/0178602 A1 | 7/2008 | Nakhamkin |
| 2009/0282840 A1 | 11/2009 | Chen et al. |
| 2012/0151961 A1 | 6/2012 | Ha et al. |
| 2017/0022897 A1 | 1/2017 | Alekseev et al. |
| 2017/0058768 A1 | 3/2017 | Bergins et al. |
| 2018/0030902 A1* | 2/2018 | Kraft ................. F02C 7/222 |
| 2018/0080379 A1 | 3/2018 | Conlon |
| 2018/0230904 A1 | 8/2018 | Conlon |
| 2018/0371993 A1 | 12/2018 | Upperman et al. |
| 2020/0056511 A1* | 2/2020 | Conlon ................. F01K 7/02 |
| 2022/0220892 A1* | 7/2022 | Berry ................. F01K 25/08 |
| 2022/0389841 A1 | 12/2022 | Pryor et al. |
| 2023/0407186 A1 | 12/2023 | Sundaram et al. |
| 2023/0408188 A1 | 12/2023 | Prosser |

\* cited by examiner

INTEGRATED GAS TURBINE CYCLE AND LIQUID AIR ENERGY CONVERSION SYSTEM

CROSS REFERENCE TO RELATED APPLICATIONS

This application claims the benefit of and priority to United States provisional patent application Ser. No. 63/678,175 filed on Aug. 1, 2024 the disclosure of which is incorporated by reference.

TECHNICAL FIELD

The present invention relates generally to energy conversion in liquid air energy storage (LAES) systems, and more particularly to the integration of gas turbine power generation with liquid air energy conversion to produce electrical energy from liquid air energy storage systems.

BACKGROUND

There is a continuing need to develop and demonstrate new energy storage and associated energy discharge systems and technologies that are both technically feasible and commercially viable. Such energy storage and discharge systems and technologies should have the capacity to discharge energy for a duration of greater than 10 hours at rated power and at a levelized cost of storage of about $0.05/kWh-cycle at some point in the near future. The targeted energy storage and discharge systems should be at a megawatt scale. Moreover, new energy storage systems and technologies should be long duration storage systems able to supply power for weekly or monthly durations and have the capacity to continuously discharge energy on a daily or diurnal cycle for between 10 hours to 100 hours or more.

Liquid air energy storage (LAES) is a known technology that is well suited for longer duration, and greater power generation magnitude than can be achieved economically with lithium-ion batteries. The liquefaction of ambient air can be accomplished at high efficiency with known gas turbo-expansion based equipment and processes. However, the effective extraction of the energy contained or stored within the liquid air is far more difficult challenge. Roughly 50% of the energy contained within liquid air is contained in the cryogenic, sub-ambient state. Conventional approaches to extraction and recovery of this energy from liquid air involve periodic heat exchange with cold stores (i.e. solids and liquids of high thermal capacitance) as generally disclosed in United States Patent Application Publications US2017/0022897 and US2023/0408188.

The cost and complexity of conventional LAES systems, including those that employ the use of cold stores, is relatively high and thus a barrier to widespread adoption and use in the long duration energy storage market. Unlike most other energy storage technologies, LAES systems often require mostly discrete and separate equipment for the charging step and the generating step, which represents a fundamental problem. To realize widespread adoption of LAES based systems, there must be a significant cost reduction of the LAES equipment or, more preferably, a step change in the extraction and recovery of energy from the liquid air.

Such step changes in the extraction and recovery of energy from the liquid air (or the power discharge phase of LAES systems) involves maximizing the potential power generated from liquid air by using energy from associated systems. One such approach would be integration of conventional gas turbine power generation with liquid air energy extraction. To advance such an approach, there is a need to develop technically and economically viable processes which effectively integrate with the pressure levels and flows between LAES systems and conventional gas turbine power generation systems, and to find ways to utilize the available waste heat from conventional gas turbine power generation systems.

SUMMARY

The present invention may be broadly characterized as an integrated gas turbine and liquid air energy conversion system comprising: (i) one or more very high pressure air streams produced from vaporization of a supercritical liquid air stream against a low pressure cryogenic gas stream that is cooled to yield a cooled, low pressure cryogenic gas; (ii) one or more moderate pressure cryogenic gas streams, at least one of which is produced from cold compression of the cooled, low pressure cryogenic gas; (iii) a gas turbine configured to receive a stream of combustion gas, expand the combustion gas to yield a flue gas exhaust stream and shaft work used to create a first source of electrical power; (iv) a flue gas heat exchanger configured to cool the flue gas exhaust stream to yield a cooled waste stream via indirect heat exchange with: (a) all of or a portion of the one or more very high pressure air streams to yield a first warmed stream; and/or (b) all of or a portion of the one or more moderate pressure cryogenic gas streams to yield a second warmed stream; (v) a first turbine-expander configured to expand the first warmed stream and to produce a first moderate pressure exhaust stream and shaft work used to create a second source of electrical power; and (vi) a second turbine-expander configured to expand the second warmed stream or the first exhaust stream and to produce a second moderate pressure exhaust stream and shaft work used to create a third source of electrical power. The combustion gas is produced from the combustion of a fuel source, such as natural gas or hydrogen with one or more oxygen containing streams including a moderate pressure supplemental stream.

The invention may also be characterized as a method of energy recovery from liquid air, comprising the steps of: (a) receiving one or more very high pressure air streams from vaporization of the liquid air; (b) receiving one or more moderate pressure cryogenic gas streams; (c) expanding a stream of combustion gas to yield a flue gas exhaust stream and shaft work used to create a first source of electrical power; (d) cooling the flue gas exhaust stream to yield a cooled waste stream via indirect heat exchange with: (i) all of or a portion of the one or more very high pressure air streams to yield a first warmed stream; and (ii) all of or a portion of the one or more moderate pressure cryogenic gas streams to yield a second warmed stream; (e) expanding the first warmed stream in a first turbine-expander configured to produce a first moderate pressure exhaust stream and shaft work used to create a second source of electrical power; (f) expanding the second warmed stream or the first moderate pressure exhaust stream in a second turbine-expander to produce a second moderate pressure exhaust stream and shaft work used to create a third source of electrical power.

In addition, the method preferably includes several initial steps to produce the one or more moderate pressure cryogenic streams and the one or more very high pressure air streams. These initial steps include: pumping the liquid air to a supercritical pressure to yield the supercritical liquid air stream; vaporizing the supercritical liquid air stream against a low pressure cryogenic gas stream to yield one or more very high pressure air streams and a cooled, low pressure cryogenic gas; and cold compressing the cooled, low pressure cryogenic gas to yield one of the one or more moderate pressure cryogenic gas streams. Also, as indicated above, the combustion gas is produced from the combustion of a fuel source with one or more oxygen containing streams, including a moderate pressure supplemental stream.

In the preferred embodiments of the present system and method, the cryogenic gas is a gas that has a normal boiling point equal to or less than about −150° C., and more preferably a pre-purified air stream at a pressure in the range of about 3 bar (a) to 10 bar (a). Also, the one or more moderate pressure cryogenic streams as well as the one or more very high pressure air streams may be hydrated with a source of water.

The moderate pressure supplemental stream can comprise different streams, including: (1) all or a portion of the first moderate pressure exhaust stream; (2) all or a portion of the second moderate pressure exhaust stream; (3) all or a portion of at least one of the one or more moderate pressure cryogenic gas streams; (4) a portion of the one or more very high pressure air streams; or (5) mixtures of the above-identified streams.

BRIEF DESCRIPTION OF THE DRAWINGS

The above and other aspects, features, and advantages of certain embodiments of the present disclosure will be more apparent from the following detailed description taken in conjunction with the drawing in which.

DETAILED DESCRIPTION

As used herein, the term or phrase 'low pressure' means a pressure near ambient, and more particularly at a pressure of 10 bar (a) or less whereas the term or phrase 'moderate pressure' refers to a pressure that might exist at the gas turbine inlet in a conventional gas turbine based power recovery section of the liquid air energy conversion system, and more particularly, a pressure between about 10 bar (a) to about 50 bar (a). Likewise, the term or phrase 'very high pressure' refers to a pressure where the fluid is substantially supercritical, and for liquid air energy conversion, preferably to a pressure of 75 bar (a) or higher.

From a definition standpoint the term or phrase 'air' and 'air stream' should be construed to mean an oxygen and nitrogen containing stream that has an oxygen concentration not less than 10%. However, the term or phrase 'liquid air' as used in this document should be understood to include cryogenic liquids having a nitrogen content greater than or equal to 70%, so as to include conventional liquified air as well as liquid nitrogen. Also, the term or phrase 'cryogenic gas' being defined to mean a gas possessing a boiling point less than or equal to −150° C.

The present system and method provides an alternative energy conversion solution that integrates a conventional gas turbine cycle with a variation of conventional LAES systems. Specifically, the present solution represents an integrated gas turbine cycle and liquid air energy conversion system and which utilizes one or more very high pressure air streams produced from vaporization of a supercritical liquid air against a low pressure cryogenic gas. The cooled, low pressure cryogenic gas is then cold compressed and further processed to yield one or more moderate pressure cryogenic gas streams. The one or more very high pressure air streams and the one or more moderate pressure air streams are warmed in the flue gas heat exchanger associated with the gas turbine cycle using the waste heat from the gas turbine cycle. A first source of electrical power is produced from the shaft work resulting from the expansion of a combustion gas in a gas turbine while auxiliary sources of electrical power are produced from the shaft work resulting from the turbine expansion of the warmed very high pressure air streams, and the warmed moderate pressure cryogenic gas streams.

The combustion gas is produced from the combustion of a fuel source such as natural gas with one or more oxygen containing streams, including a moderate pressure supplemental stream. An important aspect of the present system and method is that the moderate pressure supplemental stream preferably originates either from the supercritical liquid air or from the cold compressed cryogenic gas.

Figure 1:
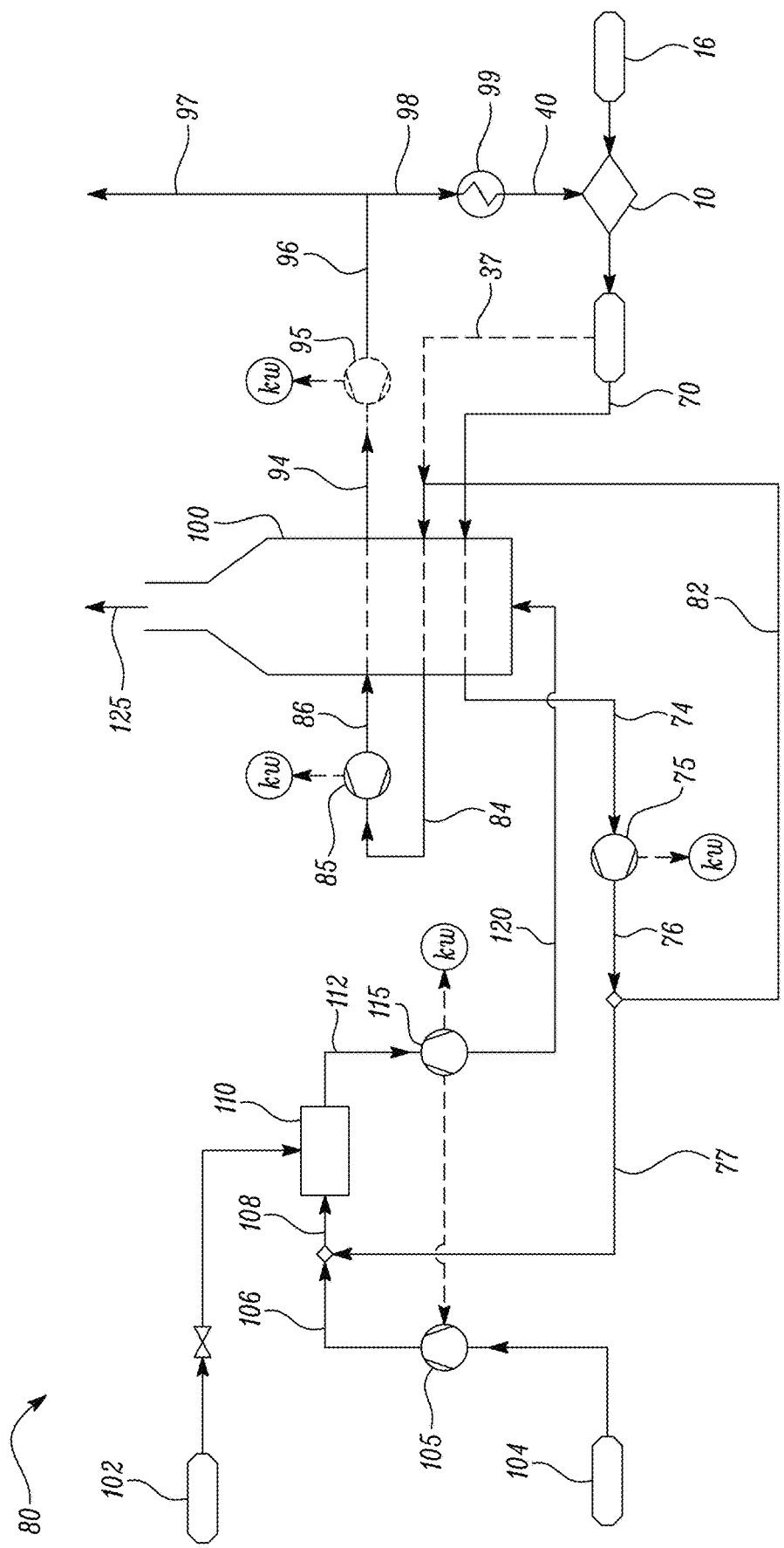
FIG. 1 is a schematic illustration of an embodiment of the present system and method.

Turning now to the embodiment depicted in FIG. 1, a source of ambient air 104 is compressed in a main air compressor 105 with the compressor discharge stream 106 together with a fuel source 102 such as natural gas are directed to a combustion device 110 such as a burner. A typical peak operating pressure for such a conventional gas turbine cycle arrangement is on the order of about 15 bar (a) to 40 bar (a). A typical exit temperature of the combustion stream 112 is about 1500° C. The hot combustion stream 112 is then expanded through a gas turbine 115. The gas turbine 115 is operatively coupled to the main air compressor 105 such that the shaft work of expansion powers the main air compressor and also serves to generate some additional electrical power (kw). The exhaust stream 120 from the gas turbine is at a temperature of about 600° C. and is directed to additional cooling (e.g. combined cycle) in a flue gas heat exchanger 100. Unlike conventional combined cycles that use steam, the depicted process uses a moderate pressure supplemental gas stream 77 in lieu of steam.

The source of moderate pressure supplemental gas preferably originates from another section 10 of the liquid air energy storage (LAES) system. This other section 10 of the LAES system produces a very high pressure gaseous air stream 70 through vaporization of a pumped, supercritical liquid air stream 16 via indirect heat exchange against a low pressure, pre-purified stream of a cryogenic gas and the subsequent cold compression of the cooled, low pressure pre-purified stream of cryogenic gas. The very high pressure air stream 70 and/or the cold compressed cryogenic gas stream 37 produced in the other section 10 of the (LAES) system are directed to a flue gas heat exchanger 100 where the very high pressure gaseous air stream 70 and/or moderate pressure cryogenic gas stream 37 are further heated or warmed The warmed very high pressure gaseous air stream (s) 74 are the expanded in turbine-expander 75 to generate power (kw) from the shaft work of the turbine-expander 75.

In the illustrated embodiment, the exhaust stream 76 from the turbine-expander is split into a first portion that forms a moderate pressure supplemental gas stream 77 and combined with the discharge stream 106 from the main air compressor 105. The combined stream 108 is directed to the combustion device 110 together with the fuel stream from the fuel source 102. Use of the moderate pressure supplemental gas stream 77 enables the main air compressor 105 to process less air thereby increasing the electrical power output (kw) of the gas turbine 115. The remaining fraction or second portion 82 of the exhaust stream 76 of turbine-expander 75 is reheated in the flue gas heat exchanger 100 and the warmed exhaust stream 84 is thereafter subjected to at least one stage of additional power expansion in auxiliary turbine-expander 85 generating additional power (kw) from the shaft work of the second auxiliary turbine-expander 85. The auxiliary exhaust stream 86 from auxiliary turbine-expander 85 may be still further re-heated or warmed in the flue gas heat exchanger 100 and the reheated auxiliary exhaust stream 94 is thereafter subjected to yet another expansion stage in second auxiliary turbine-expander 95 generating a second auxiliary exhaust stream 96 and additional electrical power (kw) from the shaft work of the second auxiliary turbine-expander 95.

As indicated above, the section 10 of the LAES system that produces the very high pressure gaseous air stream 70 and moderate pressure cryogenic gas 37 requires a low pressure, clean, dry stream of cryogenic gas, preferably a low pressure, pre-purified stream of gaseous air. Therefore, it is possible to supply the low pressure, pre-purified stream of gaseous air 40 from the present system 80, and more particularly from the auxiliary exhaust streams 86, 96 from turbine-expanders 85, 95, respectively. Moreover, it is also possible and preferable to back-pressure turbine-expanders 85 and 95 to a pressure suitable for the production of the very high pressure gaseous air stream 70. A typical pressure range for the pre-purified stream of gaseous air 40 used to produce the very high pressure gaseous air stream 70 may be about 3 bar (a) and 10 bar (a). Recycling a low pressure, pre-purified air stream 98 from the auxiliary exhaust streams 86, 96 from turbine-expanders 85, 95 back to section 10 of the liquid air energy storage (LAES) system may also require temperature adjustment in a heat exchanger 99 to produce the pre-purified stream of gaseous air 40 at or near ambient temperatures.

The use of the very high pressure air stream 70 in the above-described system and method will also obviate the need for an additional air feed that may be required to replace leakage and whatever other gas flows are needed in the above-described gas turbine cycle. Alternatively, the auxiliary exhaust streams 86, 96 from auxiliary turbine-expanders 85, 95 respectively may be vented to atmosphere or it may be directed as stream 97 to another use of pressurized air in the LAES system or associated processes. For example, such pressurized air stream 97 can be used for purposes of cryogenic air separation or used in a process suitable for the reduction of liquid air into liquid nitrogen, liquid oxygen, and liquid argon.

Figure 2:
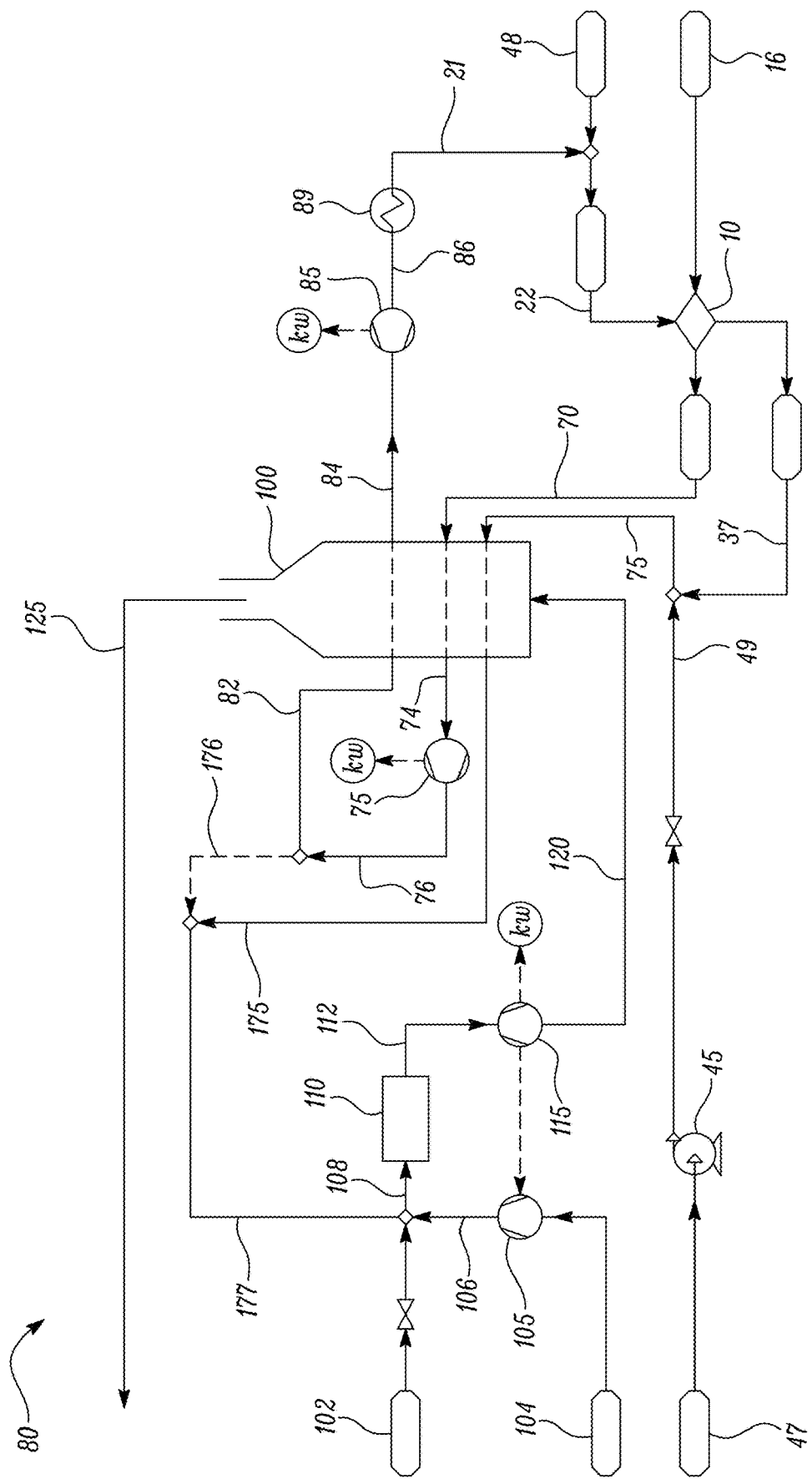
FIG. 2 is a schematic illustration of an alternate embodiment of the present system and method.

Turning now to FIG. 2, an alternate embodiment of the present system and method is shown. As illustrated therein, a pumped, supercritical liquid air stream 16 is vaporized via indirect heat exchange against a low pressure, pre-purified stream of a cryogenic gas 22 is a cryogenic air processing section 10 of a LAES system. The cryogenic air processing section 10 of the LAES system. produces a very high pressure gaseous air stream 70 through vaporization of a pumped, supercritical liquid air stream 16 via indirect heat exchange against a low pressure, pre-purified stream of a cryogenic gas 22. The cooled, low pressure pre-purified stream of cryogenic gas is then cold compressed in the cryogenic air processing section 10 to yield a moderate pressure cryogenic gas 37.

The illustrated system also includes a gas turbine cycle that comprises a gas turbine 115 configured to receive a stream of combustion gas 112 produced from the combustion of a combustion stream 108. The combustion stream preferably includes a fuel such as natural gas or hydrogen (or a mixture thereof) from one or more fuel sources 102 and one or more moderate pressure oxygen containing streams 177, 106. The illustrated one or more moderate pressure oxygen containing streams includes a stream of compressed air 106 generated from the compression of a feed air stream 104 in main air compressor 105 as well as a moderate pressure supplemental stream 177 originating from the very high pressure air stream 70 or the moderate pressure cryogenic gas 37. The resulting combustion gas is combusted in a combustion device 110, such as a burner, to yield the stream of combustion gas 112.

The gas turbine 115 is configured to expand the combustion gas 112 to yield a flue gas exhaust stream 120 and shaft work used to create a first source of electrical power (kw) and to drive the main air compressor 105. The flue gas exhaust stream 120 is directed to a flue gas heat exchanger 100 configured to cool the flue gas exhaust stream to yield a cooled waste stream 125 via indirect heat exchange with multiple cooling streams.

The first cooling stream is the very high pressure air stream 70 which is warmed in flue gas heat exchanger 100 to yield a first warmed stream 74. The first warmed stream 74 is then expanded in a first turbine-expander 75 to produce a first moderate pressure exhaust stream 76 and shaft work used to create a second source of electrical power (kw). All or a portion of the first moderate pressure exhaust stream 76 is directed as a third cooling stream 82 to the flue gas heat exchanger 100 where it is re-heated to yield a first warmed exhaust stream 84. A second turbine-expander 85 is configured to expand the first warmed exhaust stream 84 and produce a second moderate pressure exhaust stream 86 and shaft work used to create a third source of electrical power (kw). The second moderate pressure exhaust stream 86 is brought to near ambient temperatures in heat exchanger 89 and recycled as cryogenic gas stream 21 back to the cryogenic air processing section 10. Make-up and/or feed cryogenic gas from an auxiliary source 48 may also be introduced to the cryogenic air processing section 10.

The second cooling stream in the illustrated embodiment is stream 75 which is a the moderate pressure cryogenic gas received from the cryogenic air processing section 10 that is preferably hydrated with stream of water 49 pumped via pump 45 from a source of water 47. The second cooling stream 75 is warmed in flue gas heat exchanger 100 to another warmed stream 175 that forms all of or a portion of the moderate pressure supplemental stream 177. As shown in FIG. 2, the moderate pressure supplemental stream 177 may also include a portion 176 of the first moderate pressure exhaust stream 76.

In an alternative arrangement, the second turbine-expander 85 may be configured to expand the second warmed stream 175 in lieu of the first warmed exhaust stream 84. In such arrangement, all of or a portion of the first warmed exhaust stream would form the moderate pressure supplemental stream 177. A still further variant of this alternative arrangement would further comprise a third turbine-expander configured expand a portion of the warmed first exhaust to produce a third exhaust stream and shaft work used to create a fourth source of electrical power. In fact, from a broad perspective, the moderate pressure supplemental stream may comprise: (1) all or a portion of the first moderate pressure exhaust stream (warmed or unwarmed); (2) all or a portion of the second moderate pressure exhaust stream (warmed or unwarmed); (3) all or a portion of the moderate pressure cryogenic gas streams (warmed); or mixtures/combinations of these moderate pressure streams.

While the present system and method has been described with reference to certain embodiments, various changes may be made without departing from the spirit and the scope of the invention, which is defined, not by the detailed description and illustrated embodiments, but by the appended claims and their equivalents.

What is claimed is:

1. A method of energy recovery from liquid air, comprising the steps of:
   (a) receiving one or more very high pressure air streams from vaporization of the liquid air;
   (b) receiving one or more moderate pressure cryogenic gas streams;
   (c) expanding a stream of combustion gas to yield a flue gas exhaust stream and shaft work used to create a first source of electrical power;
   (d) cooling the flue gas exhaust stream to yield a cooled waste stream via indirect heat exchange with: (i) all of or a portion of the one or more very high pressure air streams to yield a first warmed stream; and (ii) all of or a portion of the one or more moderate pressure cryogenic gas streams to yield a second warmed stream;
   (e) expanding the first warmed stream in a first turbine-expander configured to produce a first moderate pressure exhaust stream and shaft work used to create a second source of electrical power; and
   (f) expanding the second warmed stream or the first moderate pressure exhaust stream in a second turbine-expander to produce a second moderate pressure exhaust stream and shaft work used to create a third source of electrical power;
   wherein the combustion gas is produced from the combustion of a fuel source with one or more oxygen containing streams, and wherein at least one of the oxygen containing streams is a moderate pressure supplemental stream; and
   wherein the one or more moderate pressure cryogenic gas streams comprises a pre-purified air stream at a pressure in the range of about 3 bar (a) to 10 bar (a) and that has a normal boiling point equal to or less than −150° C.

2. The method of claim 1, wherein the second warmed stream is expanded in the second turbine-expander and the method further comprising the steps of:
   (g) warming a first exhaust stream in a flue gas heat exchanger;
   (h) expanding the warmed first exhaust stream to produce a third exhaust stream and shaft work used to create a fourth source of electrical power.

3. The method of claim 1, wherein the moderate pressure supplemental stream is all or a portion of the first moderate pressure exhaust stream.

4. The method of claim 1, wherein the moderate pressure supplemental stream is all or a portion of the second moderate pressure exhaust stream.

5. The method of claim 1, wherein the moderate pressure supplemental stream is a mixture of two or more streams selected from the group consisting of a portion of the first moderate pressure exhaust stream, a portion of the second moderate pressure exhaust stream, a portion of the one or more moderate pressure cryogenic gas streams; and a portion of the one or more very high pressure air streams.

6. The method of claim 1, wherein the one or more very high pressure air streams is hydrated with a source of water.

7. The method of claim 1, wherein the fuel source is natural gas or hydrogen or a mixture of hydrogen and natural gas.

8. The method of claim 1, wherein at least another one of the oxygen containing streams is a compressed air stream at a pressure in the range of 10 bar (a) to 50 bar (a).

9. The method of claim 1, further comprising the initial steps of:
   pumping the liquid air to a supercritical pressure to yield a supercritical liquid air stream;
   vaporizing the supercritical liquid air stream against a low pressure cryogenic gas stream to yield the one or more very high pressure air streams and a cooled, low pressure cryogenic gas; and
   cold compressing the cooled, low pressure cryogenic gas to yield one of the one or more moderate pressure cryogenic gas streams.

10. The method of claim 9, wherein the cooled, low pressure cryogenic gas is all of or a portion of at least one of the one or more moderate pressure cryogenic gas streams.

11. The method of claim 9, wherein the moderate pressure supplemental stream is a portion of the one or more very high pressure air streams produced from vaporization of the supercritical liquid air stream that has been reduced in pressure.

12. A method of energy recovery from liquid air, comprising the steps of:
   (a) receiving one or more very high pressure air streams from vaporization of the liquid air;
   (b) receiving one or more moderate pressure cryogenic gas streams;
   (c) expanding a stream of combustion gas to yield a flue gas exhaust stream and shaft work used to create a first source of electrical power;
   (d) cooling the flue gas exhaust stream to yield a cooled waste stream via indirect heat exchange with: (i) all of or a portion of the one or more very high pressure air streams to yield a first warmed stream; and (ii) all of or a portion of the one or more moderate pressure cryogenic gas streams to yield a second warmed stream;
   (e) expanding the first warmed stream in a first turbine-expander configured to produce a first moderate pressure exhaust stream and shaft work used to create a second source of electrical power; and
   (f) expanding the second warmed stream or the first moderate pressure exhaust stream in a second turbine-expander to produce a second moderate pressure exhaust stream and shaft work used to create a third source of electrical power;
   wherein the combustion gas is produced from the combustion of a fuel source with one or more oxygen containing streams, and wherein at least one of the oxygen containing streams is all or a portion of the first moderate pressure exhaust stream.

13. The method of claim 12, further comprising the initial steps of:
   pumping the liquid air to a supercritical pressure to yield a supercritical liquid air stream;
   vaporizing the supercritical liquid air stream against a low pressure cryogenic gas stream to yield the one or more very high pressure air streams and a cooled, low pressure cryogenic gas; and
   cold compressing the cooled, low pressure cryogenic gas to yield one of the one or more moderate pressure cryogenic gas streams.

14. The method of claim 12, wherein the second warmed stream is expanded in the second turbine-expander and the method further comprising the steps of:
   (g) warming a first exhaust stream in a flue gas heat exchanger; and
   (h) expanding the warmed first exhaust stream to produce a third exhaust stream and shaft work used to create a fourth source of electrical power.

15. The method of claim 12, wherein the one or more moderate pressure cryogenic gas streams comprises a gas that has a normal boiling point equal to or less than −150° C.

16. The method of claim 15, wherein the one or more moderate pressure cryogenic gas streams comprise a pre-purified air stream at a pressure in the range of about 3 bar (a) to 10 bar (a).

17. The method of claim 12, wherein the one or more very high pressure air streams is hydrated with a source of water.

18. The method of claim 12, wherein the fuel source is natural gas or hydrogen or a mixture of hydrogen and natural gas.

19. The method of claim 12, wherein at least another one of the oxygen containing streams is a compressed air stream at a pressure in the range of 10 bar (a) to 50 bar (a).

* * * * *